US012502755B2

(12) United States Patent
Julius et al.

(10) Patent No.: US 12,502,755 B2
(45) Date of Patent: Dec. 23, 2025

(54) POWERED FASTENER DRIVER

(71) Applicant: MILWAUKEE ELECTRIC TOOL CORPORATION, Brookfield, WI (US)

(72) Inventors: Jason M. Julius, Waukesha, WI (US); Rosalie C. Phillips, Milwaukee, WI (US); Mitchell T. Neuhoff, Waukesha, WI (US); Mark C. Hughes, Waukesha, WI (US); Bradley S. Houskamp, Wauwatosa, WI (US); Ivan N. Zozulya, Waukesha, WI (US); Jacob N. Zimmerman, Pewaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/654,099

(22) Filed: May 3, 2024

(65) Prior Publication Data

US 2024/0367298 A1 Nov. 7, 2024

Related U.S. Application Data

(60) Provisional application No. 63/464,215, filed on May 5, 2023.

(51) Int. Cl.
*B25C 1/04* (2006.01)

(52) U.S. Cl.
CPC .............. *B25C 1/047* (2013.01); *B25C 1/043* (2013.01)

(58) Field of Classification Search
CPC ........... B25C 1/047; B25C 1/043; B25C 1/06; B25C 1/008; B25C 1/04; B25C 1/041; B25C 5/13; B25C 1/001
See application file for complete search history.

(56) References Cited

U.S. PATENT DOCUMENTS

| | | | |
|---|---|---|---|
| 3,198,412 | A | 8/1965 | Roosa |
| 3,496,840 | A | 2/1970 | Wandel et al. |
| 3,524,576 | A | 8/1970 | Bader |
| 3,858,780 | A | 1/1975 | Perkins et al. |
| 4,509,669 | A | 4/1985 | Elliesen |
| 4,609,135 | A | 9/1986 | Elliesen |
| 4,932,480 | A | 6/1990 | Golsch |
| 5,025,971 | A | 6/1991 | Schafer et al. |
| 5,441,192 | A | 8/1995 | Sugita et al. |

(Continued)

FOREIGN PATENT DOCUMENTS

| | | | |
|---|---|---|---|
| CN | 2587598 | Y | 11/2003 |
| CN | 109623736 | A | 4/2019 |

(Continued)

OTHER PUBLICATIONS

Ridgid, "18V Brushless 21 Degree Framing Nailer," available at <https://www.ridgid.com/us/en/18v-brushless-21-degree-framing-nailer> web page visited Mar. 9, 2023 (6 pages).

(Continued)

*Primary Examiner* — Veronica Martin
(74) *Attorney, Agent, or Firm* — Michael Best & Friedrich LLP

(57) ABSTRACT

A powered fastener driver including a piston movable within an inner cylinder from a top-dead-center (TDC) position to a driven or bottom-dead-center (BDC) position. The piston has a reduced stroke length between the TDC position and the BDC position.

20 Claims, 10 Drawing Sheets

(56) References Cited

U.S. PATENT DOCUMENTS

| | | | |
|---|---|---|---|
| 5,626,274 | A | 5/1997 | Shkolnikov et al. |
| 5,683,024 | A | 11/1997 | Eminger et al. |
| 5,772,098 | A | 6/1998 | Crutcher |
| 6,149,046 | A | 11/2000 | Ho et al. |
| 6,199,739 | B1 | 3/2001 | Mukoyama et al. |
| 6,834,788 | B2 | 12/2004 | Popovich et al. |
| 6,899,260 | B2 | 5/2005 | Sun |
| 6,913,179 | B1 | 7/2005 | Chen |
| 6,966,476 | B2 | 11/2005 | Jalbert |
| 6,966,477 | B1 | 11/2005 | Chien-Kuo et al. |
| 7,021,511 | B2 | 4/2006 | Popovich et al. |
| 7,086,573 | B1 | 8/2006 | Wen |
| 7,104,432 | B2 | 9/2006 | Sun |
| 7,131,563 | B2 | 11/2006 | Wen |
| 7,134,586 | B2 | 11/2006 | McGee et al. |
| 7,137,186 | B2 | 11/2006 | Wojcicki et al. |
| 7,455,207 | B2 | 11/2008 | Wojcicki et al. |
| 7,686,199 | B2 | 3/2010 | Gross et al. |
| 7,699,201 | B2 | 4/2010 | Hagan et al. |
| 7,726,536 | B2 | 6/2010 | Gross et al. |
| 7,866,521 | B2 | 1/2011 | Gross et al. |
| 7,896,212 | B2 | 3/2011 | Uejima et al. |
| 7,922,054 | B2 | 4/2011 | Cole, Jr. |
| 7,950,556 | B2 | 5/2011 | Hagan |
| 7,975,777 | B2 | 7/2011 | Krondorfer et al. |
| 7,980,439 | B2 | 7/2011 | Akiba et al. |
| 8,006,881 | B2 | 8/2011 | Arata et al. |
| 8,051,919 | B2 | 11/2011 | Hagan et al. |
| 8,052,021 | B2 | 11/2011 | Wu |
| 8,083,116 | B2 | 12/2011 | Liang |
| 8,104,658 | B2 | 1/2012 | Yu |
| 8,231,039 | B2 | 7/2012 | Buck et al. |
| 8,292,143 | B2 | 10/2012 | Lee et al. |
| 8,336,748 | B2 | 12/2012 | Hlinka et al. |
| 8,393,512 | B2 | 3/2013 | Tanimoto et al. |
| 8,544,561 | B2 | 10/2013 | Aihara |
| 8,746,526 | B2 | 6/2014 | Hlinka et al. |
| D713,705 | S | 9/2014 | Mina et al. |
| 8,833,626 | B2 | 9/2014 | Perron et al. |
| 9,221,161 | B2 | 12/2015 | Miller et al. |
| 9,469,021 | B2 | 10/2016 | Gregory et al. |
| 9,486,904 | B2 | 11/2016 | Gregory et al. |
| 9,498,871 | B2 | 11/2016 | Gregory et al. |
| 9,636,811 | B2 | 5/2017 | Segura |
| 9,643,305 | B2 | 5/2017 | Gregory et al. |
| 9,649,755 | B2 | 5/2017 | Gregory et al. |
| 9,662,777 | B2 | 5/2017 | Pomeroy et al. |
| 9,664,045 | B2 | 5/2017 | Mina et al. |
| 9,701,001 | B2 | 7/2017 | Fleischer et al. |
| 9,724,812 | B2 | 8/2017 | Scabin et al. |
| 9,827,658 | B2 | 11/2017 | Gregory et al. |
| 9,827,659 | B2 | 11/2017 | Matsuno |
| 10,004,503 | B2 | 6/2018 | Huang |
| 10,173,310 | B2 | 1/2019 | Wyler et al. |
| 10,464,197 | B2 | 11/2019 | McNeill et al. |
| 10,569,403 | B2 | 2/2020 | Namouz |
| 10,589,409 | B2 | 3/2020 | Scabin et al. |
| 10,632,600 | B2 | 4/2020 | Pomeroy et al. |
| 10,632,601 | B2 | 4/2020 | Pomeroy et al. |
| 10,654,154 | B2 | 5/2020 | Schnell et al. |
| 10,710,227 | B2 | 7/2020 | Pomeroy et al. |
| 10,759,029 | B2 | 9/2020 | Schnell et al. |
| 10,800,021 | B2 | 10/2020 | Tanaka |
| 10,821,585 | B2 | 11/2020 | Kabbes et al. |
| 10,843,317 | B2 | 11/2020 | Sato et al. |
| 10,843,318 | B2 | 11/2020 | Kobori et al. |
| 10,875,166 | B2 | 12/2020 | Ueda |
| 10,888,981 | B2 | 1/2021 | Gregory et al. |
| 10,898,994 | B2 | 1/2021 | Carrier et al. |
| 10,946,506 | B1 | 3/2021 | Ueda |
| 11,072,058 | B2 | 7/2021 | Wyler et al. |
| 11,110,576 | B2 | 9/2021 | Namouz |
| 11,179,836 | B2 | 11/2021 | Gregory et al. |
| 11,224,960 | B2 | 1/2022 | Garces et al. |
| 11,446,802 | B2 | 9/2022 | Rux |
| 2003/0121948 | A1 | 7/2003 | Hsien |
| 2008/0164295 | A1 | 7/2008 | Wu et al. |
| 2010/0243286 | A1 | 9/2010 | Hoshino et al. |
| 2013/0320063 | A1 | 12/2013 | Gregory et al. |
| 2013/0320064 | A1 | 12/2013 | Gregory et al. |
| 2015/0174748 | A1 | 6/2015 | Furuta et al. |
| 2016/0368126 | A1 | 12/2016 | Liu et al. |
| 2018/0001453 | A1 | 1/2018 | Jaskot et al. |
| 2019/0039219 | A1 | 2/2019 | Suarez |
| 2019/0314967 | A1 | 10/2019 | Garces et al. |
| 2019/0375084 | A1 | 12/2019 | Bierdeman et al. |
| 2020/0114500 | A1 | 4/2020 | Bierdeman et al. |
| 2020/0130157 | A1 | 4/2020 | Rux |
| 2020/0164498 | A1 | 5/2020 | Wechselberger et al. |
| 2020/0189081 | A1 | 6/2020 | Yang et al. |
| 2020/0215672 | A1 | 7/2020 | Pomeroy et al. |
| 2020/0230791 | A1 | 7/2020 | Pomeroy et al. |
| 2020/0391365 | A1 | 12/2020 | Tanaka |
| 2020/0398413 | A1 | 12/2020 | Tanaka |
| 2021/0016424 | A1 | 1/2021 | Kabbes et al. |
| 2021/0031347 | A1 | 2/2021 | Sato et al. |
| 2021/0031351 | A1 | 2/2021 | Tanaka |
| 2021/0107125 | A1 | 4/2021 | Gregory et al. |
| 2021/0197352 | A1 | 7/2021 | Ueda |
| 2021/0299833 | A1 | 9/2021 | Zimmerman et al. |
| 2021/0299835 | A1* | 9/2021 | Ward ........................ B25C 1/06 |
| 2021/0299837 | A1 | 9/2021 | Garces et al. |
| 2021/0347022 | A1 | 11/2021 | Leathrum et al. |
| 2021/0347025 | A1 | 11/2021 | Wyler et al. |
| 2021/0347026 | A1 | 11/2021 | Wyler et al. |
| 2021/0362311 | A1 | 11/2021 | Garces et al. |
| 2021/0387318 | A1 | 12/2021 | Ueda |
| 2022/0388136 | A1 | 12/2022 | Rux |
| 2023/0364762 | A1* | 11/2023 | Baba ....................... B25C 1/047 |

FOREIGN PATENT DOCUMENTS

| | | | |
|---|---|---|---|
| CN | 110253505 | A | 9/2019 |
| CN | 212763319 | U | 3/2021 |
| EP | 0100105 | A2 | 2/1984 |
| JP | 6852570 | B2 | 3/2021 |
| WO | 2010038834 | A1 | 4/2010 |
| WO | 2011010634 | A1 | 1/2011 |
| WO | 2018056325 | A1 | 3/2018 |
| WO | 2020248531 | A1 | 12/2020 |

OTHER PUBLICATIONS

Nail Gun Depot, "Learn How The Senco Fusion System Operates," video available at <https://www.youtube.com/watch?v=tmJgRfptn40> video published to YouTube Feb. 21, 2017 (1 page).

* cited by examiner

POWERED FASTENER DRIVER

CROSS-REFERENCE TO RELATED TO APPLICATIONS

This application claims priority to U.S. Provisional Patent Application No. 63/464,215 filed on May 5, 2023, the entire contents of which is incorporated herein by reference.

FIELD OF THE INVENTION

The present invention relates to powered fastener drivers, and more specifically to gas spring-powered fastener drivers.

BACKGROUND OF THE INVENTION

There are various fastener drivers known in the art for driving fasteners (e.g., nails, tacks, staples, etc.) into a workpiece. These fastener drivers operate utilizing various means known in the art (e.g., compressed air generated by an air compressor, electrical energy, a flywheel mechanism, etc.), but often these designs are met with power, size, and cost constraints.

SUMMARY OF THE INVENTION

In some aspects, the techniques described herein relate to a powered fastener driver including: a housing; an inner cylinder within the housing; a piston movable within the inner cylinder from a top-dead-center (TDC) position to a driven or bottom-dead-center (BDC) position, the piston having a stroke length between the TDC position and the BDC position measuring 73 mm or less; a driver blade attached to the piston for movement therewith along a driving axis from the TDC position toward the BDC position for driving a fastener into a workpiece, the driver blade including a first end, a second end opposite the first end and attached to the piston, a first set of drive teeth extending from a first side of the driver blade between the first end and second end, adjacent drive teeth within the first set being separated from one another by a first distance, and a second set of drive teeth extending from the first side of the driver blade, adjacent drive teeth within the second set being separated from one another by a second distance that is equal to the first distance, wherein adjacent drive teeth in the first set and the second set, respectively, are separated from one another by a third distance that is less than each of the first and second distance; a lifter operable to move the piston and driver blade from the BDC position toward the TDC position, the lifter engaging the first set of drive teeth during a first rotation to move the piston and driver blade from the BDC position to an intermediate position between the BDC position and the TDC position, and engaging the second set of drive teeth during a second rotation to move the piston from the intermediate position toward the TDC position; and a drive unit operably coupled to the lifter to provide torque thereto, causing the lifter to rotate.

In some aspects, the techniques described herein relate to a powered fastener driver including: a housing; an inner cylinder within the housing; a piston movable within the inner cylinder from a top-dead-center (TDC) position to a driven or bottom-dead-center (BDC) position, the piston having a diameter of less than 50 mm, and a stroke length of the piston between the TDC position and the BDC position measuring 60 mm and 74 mm; a driver blade attached to the piston for movement therewith along a driving axis from the TDC position toward the BDC position for driving a fastener into a workpiece; a lifter operable to move the piston and driver blade from the BDC position toward the TDC position, the lifter including a plurality of drive pins configured to engage the driver blade, the drive pins being positioned along an imaginary circle coaxial with a rotational axis of the lifter and having a diameter of less than 60 mm; and a drive unit operably coupled to the lifter to provide torque thereto, causing the lifter to rotate.

In some aspects, the techniques described herein relate to a powered fastener driver including: a housing; an inner cylinder within the housing; a piston movable within the inner cylinder from a top-dead-center (TDC) position to a driven or bottom-dead-center (BDC) position, the piston having a stroke length between the TDC position and the BDC position measuring 73 mm or less; a driver blade attached to the piston for movement therewith along a driving axis from the TDC position toward the BDC position for driving a fastener into a workpiece, the driver blade including a first end, a second end opposite the first end and attached to the piston, a first set of drive teeth extending from a first side of the driver blade between the first end and second end, adjacent drive teeth within the first set being separated from one another by a first distance, and a second set of drive teeth extending from the first side of the driver blade, adjacent drive teeth within the second set being separated from one another by a second distance that is equal to the first distance, wherein adjacent drive teeth in the first set and the second set, respectively, are separated from one another by a third distance that is less than each of the first and second distance; a lifter operable to move the piston and driver blade from the BDC position toward the TDC position, the lifter engaging the first set of drive teeth during a first rotation to move the piston and driver blade from the BDC position to an intermediate position between the BDC position and the TDC position, and engaging the second set of drive teeth during a second rotation to move the piston from the intermediate position toward the TDC position, the lifter including a body and a plurality of drive pins supported upon the body, wherein each of the drive pins is configured to engage one of the drive teeth of the first set and one of the drive teeth of the second set, and wherein the drive pins are positioned on the body along an imaginary circle coaxial with a rotational axis of the lifter and having a diameter of less than 60 mm; and a drive unit operably coupled to the lifter to provide torque thereto, causing the lifter to rotate.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
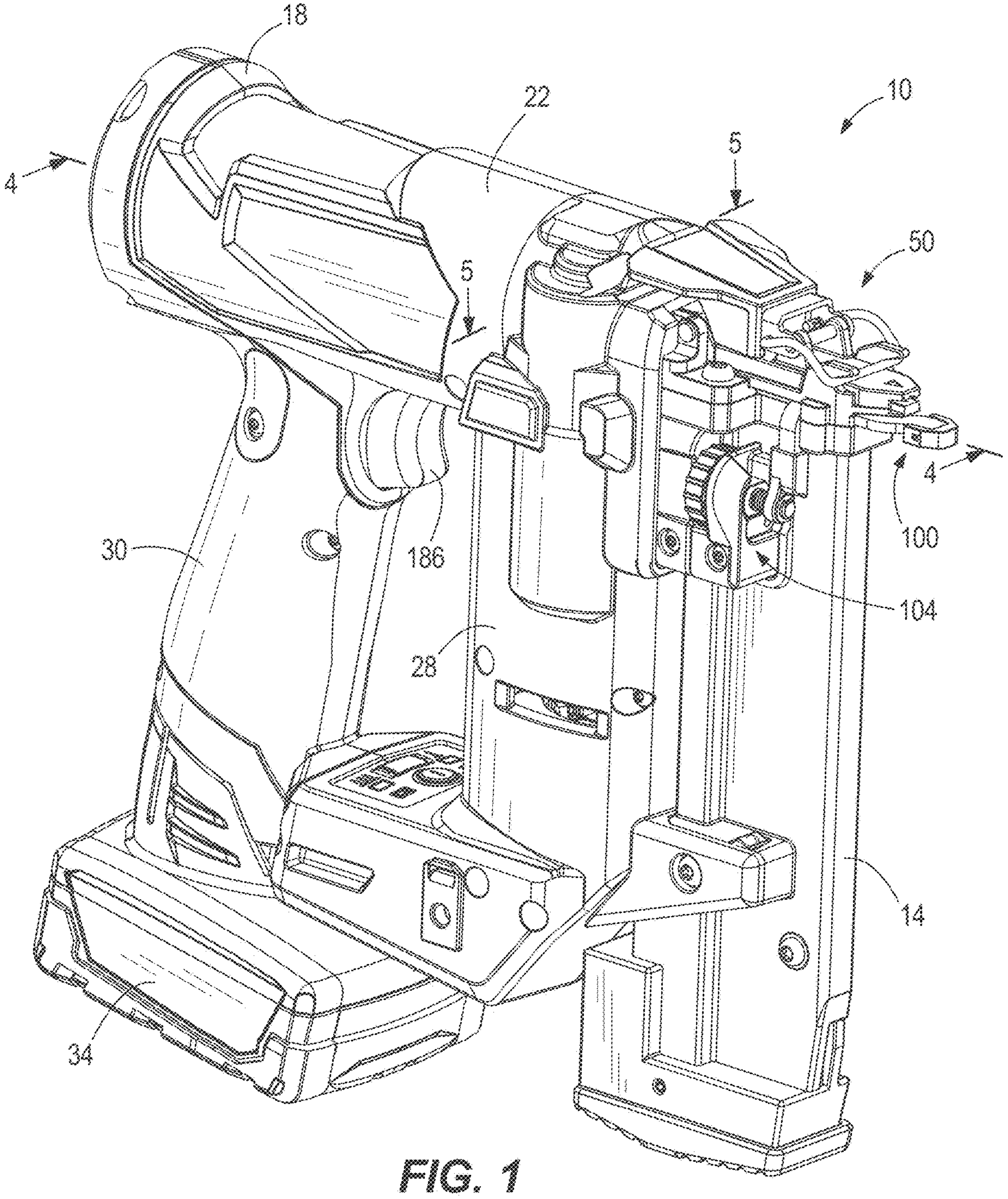
FIG. 1 is a perspective view of a gas spring-powered fastener driver in accordance with an embodiment of the invention.
Figure 2:
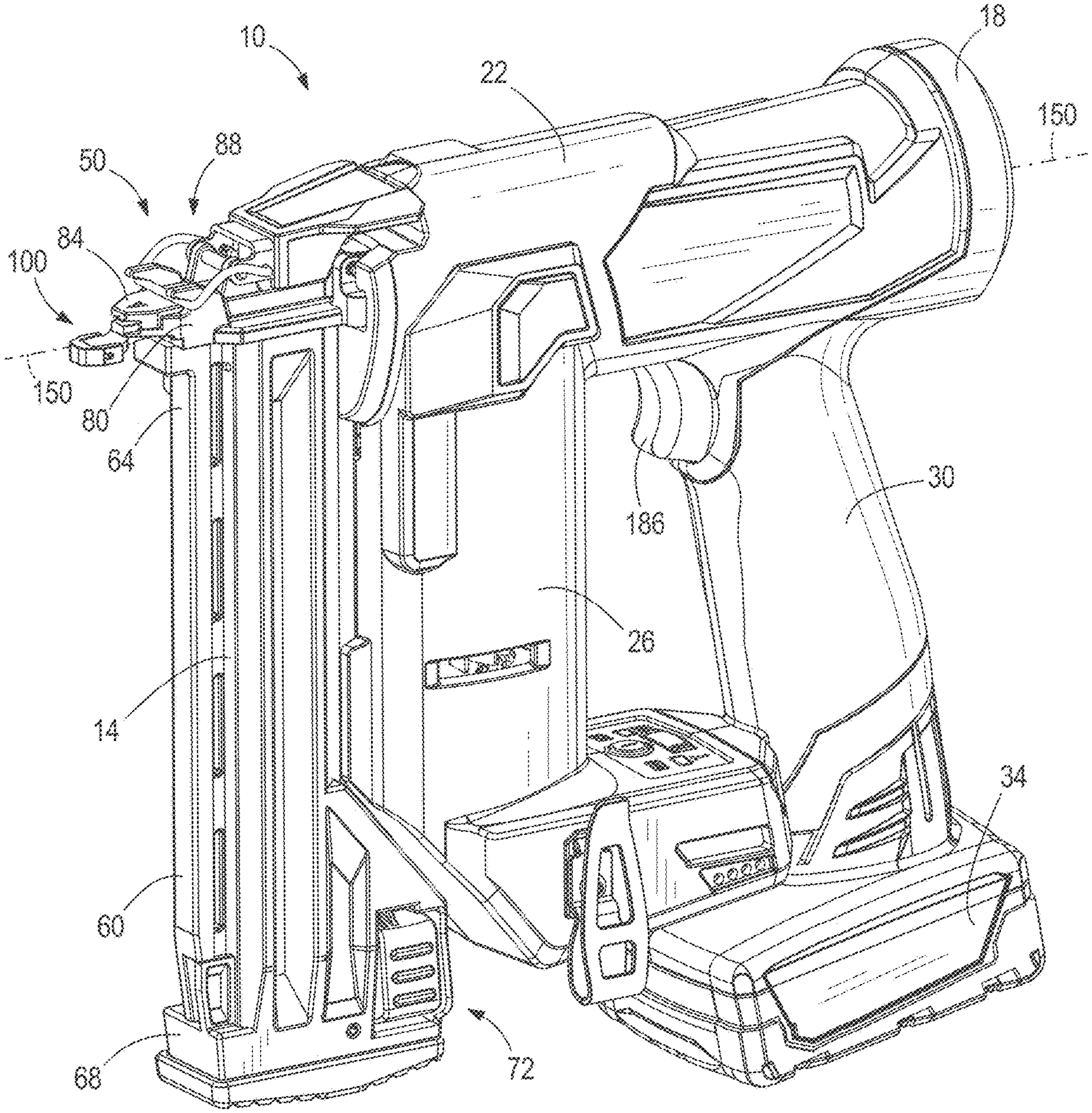
FIG. 2 is another perspective view of the gas spring-powered fastener driver of FIG. 1.

With reference to FIGS. 1-2, a gas spring-powered fastener driver 10 is operable to drive fasteners (e.g., nails, tacks, staples, etc.) held within a magazine 14 into a workpiece. The driver 10 includes a housing 18 having a cylinder support portion 22, a drive unit support portion 26, and a handle portion 30. In the illustrated embodiment, the cylinder support portion 22 extends between the drive unit support portion 26 and the handle portion 30. Accordingly, the drive unit support portion 26 and the handle portion 30 are spaced apart from one another. In the illustrated embodiment, the cylinder support portion 22, the drive unit support portion 26, and the handle portion 30 are integrally formed with one another as a single piece (e.g., using a casting or molding process, depending on the material used). A battery pack 34 is received and supported by a battery pack attachment interface of the handle portion 30.

With reference to FIG. 2, in some embodiments, the driver 10 further includes a nosepiece assembly 50 that is supported by and extends from the housing 18. The nosepiece assembly 50 is positioned at an end of the magazine 14. The magazine 14 includes a magazine body 60 configured to receive the fasteners to be driven into the workpiece by the powered fastener driver 10. The magazine body 60 (FIG. 1) has a first end 64 coupled to the nosepiece assembly 50 and a second end 68 opposite the first end 64. The magazine body 60 defines a fastener channel (not shown) extending from the first end 64 to proximate the second end 68 of the magazine body 60. The fastener channel is configured to receive the fasteners. The magazine 14 further includes a pusher assembly 72 positioned within the fastener channel 448 of the magazine body 60. The pusher assembly 72 is slidably coupled to the magazine 14 and configured to bias the fasteners in the magazine 14 toward the nosepiece assembly 50.

Figure 5:
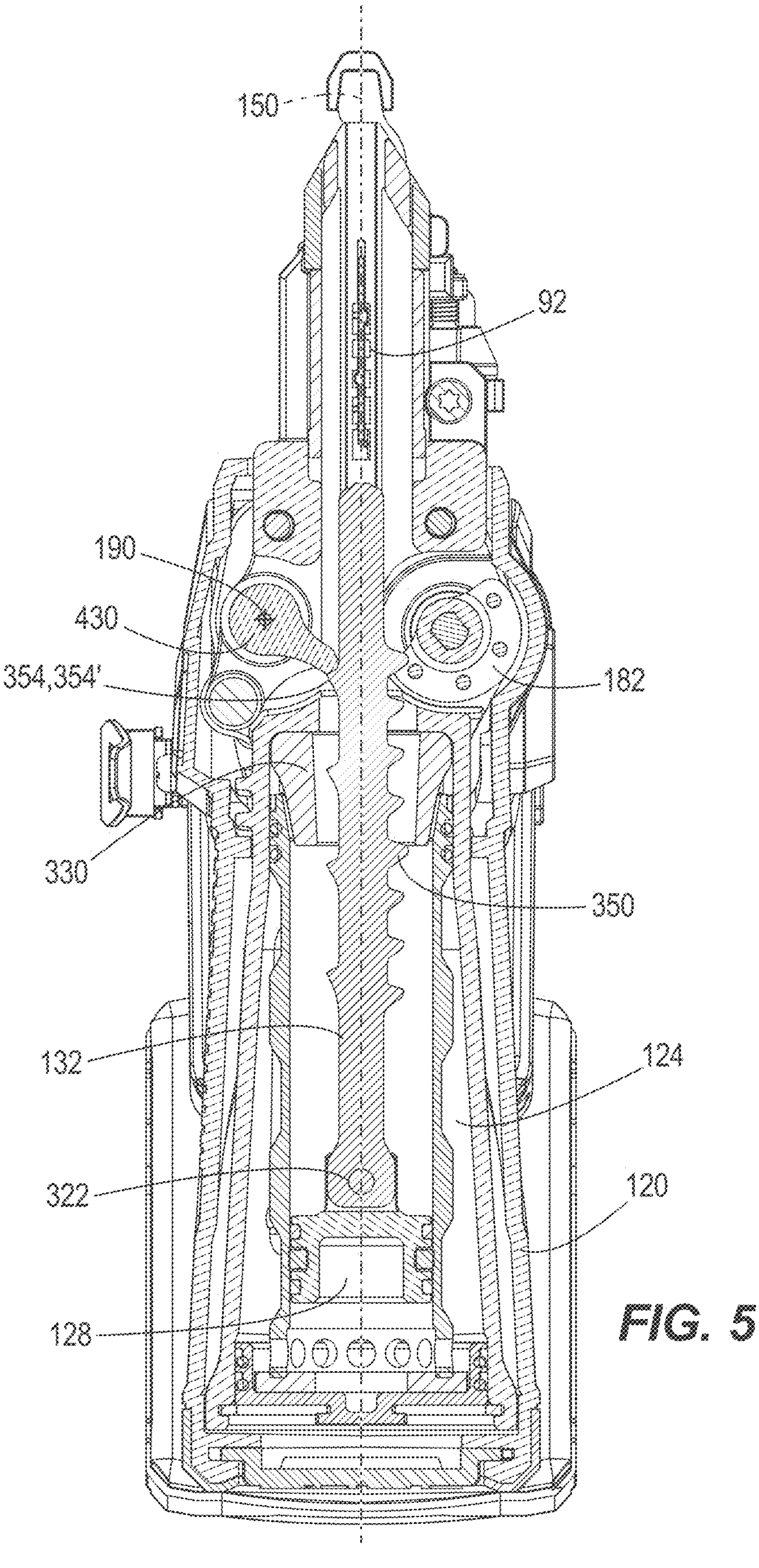
FIG. 5 is a cross-sectional view of the gas spring-powered fastener driver of FIG. 1 along line 5—5 shown in FIG. 1.

The nosepiece assembly 50 generally includes a first, base portion 80 coupled to the first end 64 of the magazine body 60 and a second, cover portion 84 coupled to the base portion 80. The base portion 80 of the nosepiece assembly 50 is fixed to the magazine body 60. The cover portion 84 of the nosepiece assembly 50 substantially covers the base portion 80. In the illustrated embodiment, the cover portion 84 is pivotally coupled to the base portion 80 by a latch mechanism 88. The nosepiece assembly 50 cooperatively defines a firing channel 92 (only a portion of which is shown in FIG. 5). The firing channel 92 is in communication with the fastener channel of the magazine body 60 for receiving a fastener from the magazine body 60. The nosepiece assembly 50 further has a distal end at one end of the firing channel 92 (FIG. 5).

With reference to FIGS. 1-3B, in some embodiments, the driver 10 includes a workpiece contact assembly 100 extending along one side of the nosepiece assembly 50. The workpiece contact assembly 100 is configured to be moved from the extended position toward a retracted position when the workpiece contact assembly 100 is pressed against a workpiece. The workpiece contact assembly 100 includes a depth of drive adjustment mechanism 104, which adjusts the effective length of the workpiece contact assembly 100. The depth of drive adjustment mechanism 104 adjusts the depth to which a fastener is driven into the workpiece. Although not shown, the powered fastener driver 10 further includes a dry-fire lockout assembly. The dry-fire lockout assembly prevents the powered fastener driver 10 from operating when the number of fasteners remaining in the magazine 14 drops below a predetermined value.

Figure 4:
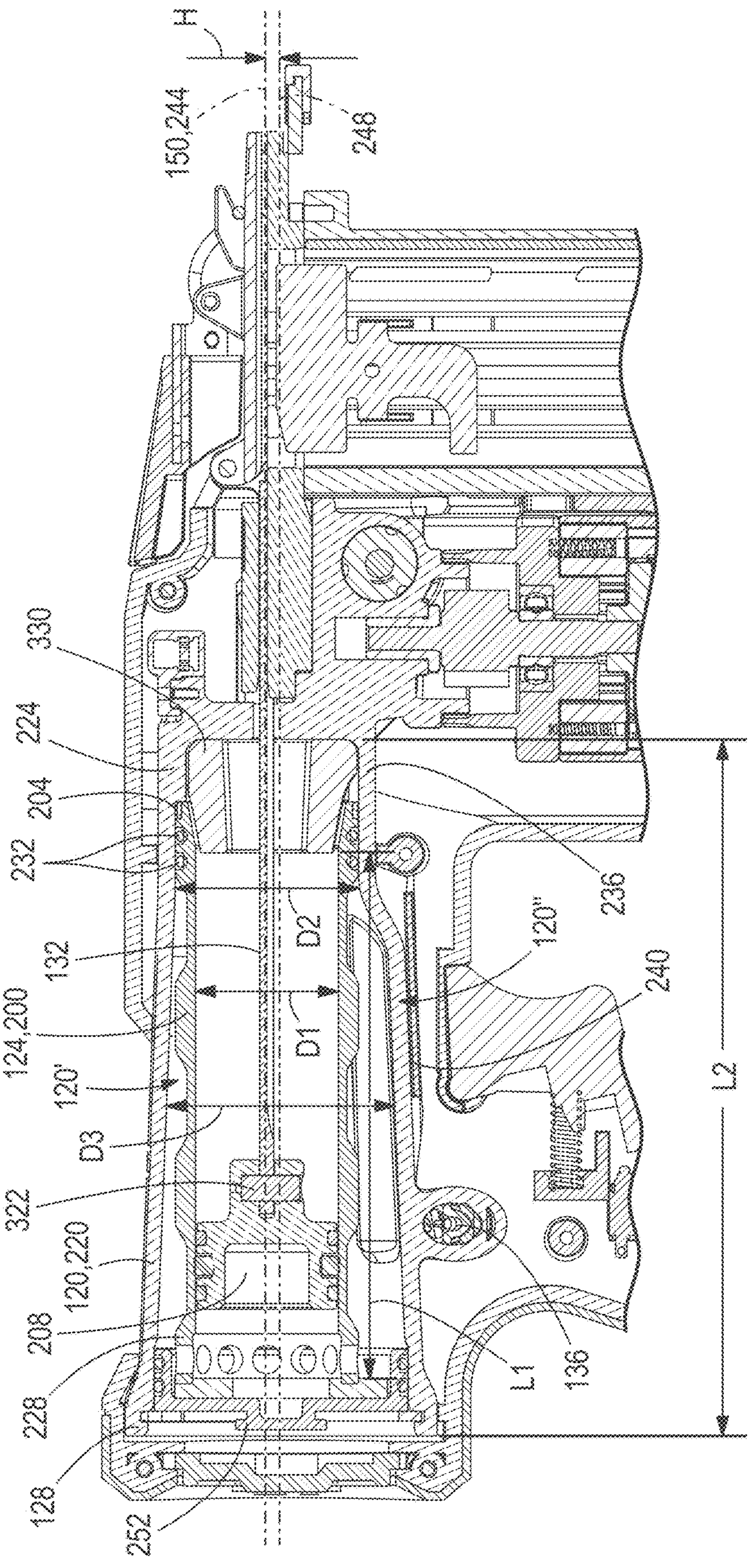
FIG. 4 is a cross-sectional view of the gas spring-powered fastener driver of FIG. 1 along line 4—4 shown in FIG. 1.

As shown in FIGS. 4-5, the fastener driver 10 includes a storage chamber cylinder 120 that is positioned within the cylinder support portion 22. An inner or driver cylinder 124 is positioned within the storage chamber cylinder 120, and a moveable piston 128 positioned within the inner cylinder 124. The fastener driver 10 further includes a driver blade 132 that is attached to the piston 128 and moveable therewith. The fastener driver 10 does not require an external source of air pressure, but rather the storage chamber cylinder 120 encloses pressurized gas in fluid communication with the inner cylinder 124. In the illustrated embodiment, the inner cylinder 124 and moveable piston 128 are positioned within the storage chamber cylinder 120. The driver 10 further includes a fill valve 136 (FIG. 4) coupled to the storage chamber cylinder 120. When connected with a source of compressed gas, the fill valve 136 permits the storage chamber cylinder 120 to be refilled with compressed gas if any prior leakage has occurred. The fill valve 136 may be configured as a Schrader valve, for example.

The inner cylinder 124 and the driver blade 132 define a driving axis 150. During a driving cycle, the driver blade 132 and piston 128 are moveable between a top-dead-center (TDC) position and a driven or bottom-dead-center (BDC) position. As shown in FIG. 3, the fastener driver 10 further includes a lifting assembly 170, a transmission 174, and a motor 178. The transmission 174 and the motor 178 are positioned within the drive unit support portion 26 of the housing 18. In the illustrated embodiment, a stroke length L1 (FIG. 4) of the driver blade 132 between the TDC and the BDC positions measures approximately 73 mm or less, which is less than conventional drivers. In some embodiments, the stroke length L1 may measure between approximately 60 mm and approximately 74 mm. In some embodiments, the stroke length L1 may be approximately 66.5 mm. The term approximately as used herein means plus or minus 5% of the stated value. The reduced stroke length L1 is achievable for various as reasons, as discussed in greater detail below. As discussed in greater detail below, the lifting assembly has a lifter 182 (FIG. 3) that is powered by the motor 178 and that moves the driver blade 132 from the driven position to the TDC position. Moreover, the transmission 174 provides torque to the lifter 182 from the motor 178.

In operation, the lifting assembly 170 drives the piston 128 and the driver blade 132 toward the TDC position by energizing the motor 178. As the piston 128 and the driver blade 132 are driven toward the TDC position, the gas above the piston 128 and the gas within the storage chamber cylinder 120 is compressed. Prior to reaching the TDC position, the motor 178 is deactivated and the piston 128 and the driver blade 132 are held in a ready position, which is located between the TDC and the BDC positions, until being released by user activation of a trigger 186 (FIG. 1). With reference to FIG. 5, in some embodiments, the driver 10 further includes a latch assembly having a pawl or latch 190 for selectively holding the driver blade 132 in the ready position. When released, the compressed gas above the piston 128 and within the storage chamber cylinder 120 drives the piston 128 and the driver blade 132 to the driven position, thereby driving a fastener into the workpiece. Specifically, the driver blade 132 is received in the firing channel 92 for driving the fastener from the firing channel 92, out the distal end of the nosepiece assembly 50, and into a workpiece. The illustrated fastener driver 10 therefore operates on a gas spring principle utilizing the lifting assembly 170 and the piston 128 to further compress the gas within the inner cylinder 124 and the storage chamber cylinder 120.

Further with respect to FIG. 4, the inner cylinder 124 is configured to guide the piston 128 and driver blade 132 along the driving axis 150 to compress the gas in the storage chamber cylinder 120. The inner cylinder 124 is therefore sized and shaped according to the size and shape of the piston 128. The inner cylinder 124 includes an inner annular wall 200 that has a first end 204 and a second end 208 that is opposite the first end 204. The inner cylinder defines a substantially uniform inner diameter D1. In the illustrated embodiment, the inner cylinder 124 defines an inner diameter D1 of approximately 20 mm to approximately 50 mm. Preferably, the inner cylinder 124 defines an inner diameter D1 of less than approximately 51 mm. The piston 128 is positioned adjacent the second end 208 in the TDC position and the piston 128 is positioned between the first end 204 and the second end 208 in the BDC position.

With continued reference to FIG. 4, the storage chamber cylinder 120 has an annular outer wall 220 circumferentially surrounding the inner wall 200. More specifically, the storage chamber cylinder 120 extends from a first end 224 to a second end 228. Each of the illustrated first and second ends 224, 228 of the storage chamber cylinder 120, respectively, are circular. The first end 204 of the inner cylinder 124 is affixed to the first end 224 of the storage chamber cylinder 120. The first ends 204, 224 may be affixed in any suitable manner (e.g., press-fit engagement, threaded engagement, etc.). A seal 232 is disposed between the first end 204 of the inner cylinder 124 and the first end 224 of the storage chamber cylinder 120. The seal 232 prevents pressurized gas from escaping between the storage chamber cylinder 120 and the inner cylinder 124.

The storage chamber cylinder 120 includes a first portion 236 and a second portion 240 adjacent the first portion 236. The first portion 236 is adjacent the first end 224, and has a second inner diameter D2 that is generally constant. The first portion 236 defines a first longitudinal axis 244 that is co-linear with the driving axis 150. The second portion 240 is adjacent the second end 228. The second portion 240 extends from the first portion 236 toward the second end 228. The second end 228 has a third inner diameter D3 that is variable along a length of the second portion 240 between the first portion 236 and the second end 228. As shown, the third diameter D3 generally increases from the first portion 236 to the second end 228. The second portion 240 defines a second longitudinal axis 248 coaxial with the second end 228. In other words, the second end 228 defines the second longitudinal axis 248 that extends through a center of the second end 228. The second longitudinal axis 248 extends parallel to and spaced from the driving axis 150 (e.g., the second longitudinal axis 248 is radially below the first longitudinal axis 244/driving axis 150 from the frame of reference of FIG. 4). The first and second longitudinal axes 244, 248, respectively, are offset. Accordingly, the storage chamber cylinder 120 is non-concentric with the inner cylinder 124. Moreover, as shown, the storage chamber cylinder defines a volume. A first portion 120' of the volume of the storage chamber cylinder 120 is defined generally on a first side of the driving axis 150 and a second portion 120" of the storage chamber cylinder 120 is defined generally on a second, opposite side of the driving axis 150. The second portion 120" is at least partially positioned between the drive unit support portion 26 of the housing 18 and the handle portion 30 of the housing 18. The second portion 120" has a greater volume than the first portion 120'. The driver 10 further includes an end cap 252 positioned at the second end 228. The end cap 252 fluidly seals the inner cylinder 124 and the storage chamber cylinder 120 from the outside atmosphere.

The second longitudinal axis 248 is spaced from the first longitudinal axis 244 by an offset distance H. The offset distance H between the first longitudinal axis 244 and the second longitudinal axis 248 is between approximately 5% and approximately 25% of the second diameter D2. In some embodiments, the offset distance H is between approximately 5% and approximately 20% of the second diameter D2. In further embodiments, the offset distance H is between approximately 5% and approximately 15% of the second diameter D2. In yet further embodiments, the offset distance H is between approximately 5% and approximately 10% of the second diameter D2. In yet further embodiments, the offset distance H is greater than approximately 25% of the second diameter D2. In the illustrated embodiment, the offset distance H is approximately 21% of the second diameter D2.

The non-concentric configuration of the inner cylinder 124 and the storage chamber cylinder 120 may reduce an overall size of the driver 10, and may facilitate positioning of the driver 10 in tight spaces during use of the driver 10. Specifically, an overall height of the driver 10 may be reduced as compared to conventional drivers. In addition, this configuration shifts the center of mass of the cylinders 120, 124 closer to the second end 228 where the handle portion 30 of the driver 10 is located (FIGS. 1-2), which may improve the balance and/or handling of the driver 10 while in use. Also, a length L2 of the storage chamber cylinder 120 may be less than the length of the storage chamber cylinders of conventional drivers. In the illustrated embodiment, the length L2 (FIG. 4) measures approximately 100 mm. In other embodiments, the length L2 (FIG. 4) measures approximately 173 mm. In other embodiments, the length L2 of the storage chamber cylinder 120 between the first and second ends 224, 228 may range from approximately 98 mm to 175 mm. In other embodiments, the length L2 of the storage chamber cylinder 120 between the first and second ends 224, 228 may range from approximately 90 mm to 190 mm. Additionally, the non-concentric configuration of the inner cylinder 124 and the storage chamber cylinder 120 is one of the factors that enables the stroke length L1 of the driver blade 132 to be reduced. This is because, despite the smaller footprint of the driver 10, the storage chamber cylinder 120 can still accommodate the necessary amount of gas. The amount of pressurized gas may range from approximately 60 $cm^3$ to approximately 300 $cm^3$. In the illustrated embodiments, the amount of pressurized gas may be approximately 100 $cm^3$. Therefore, while the stroke length L1 is reduced and footprint of the driver 10 are reduced, the volume of the storage chamber cylinder 120 still enables a striker force of 1181*bf* to 1251*bf* at TDC may still be produced. This allows for a favorable compression ratio of no more than approximately 1.6. In some embodiments, the compression ratio may be between approximately 1.4 and approximately 1.6. The low compression ratio reduces the lifting shear stress the lifter 182 experiences during operation to, for example, 1220 MPa.

Figure 6A:
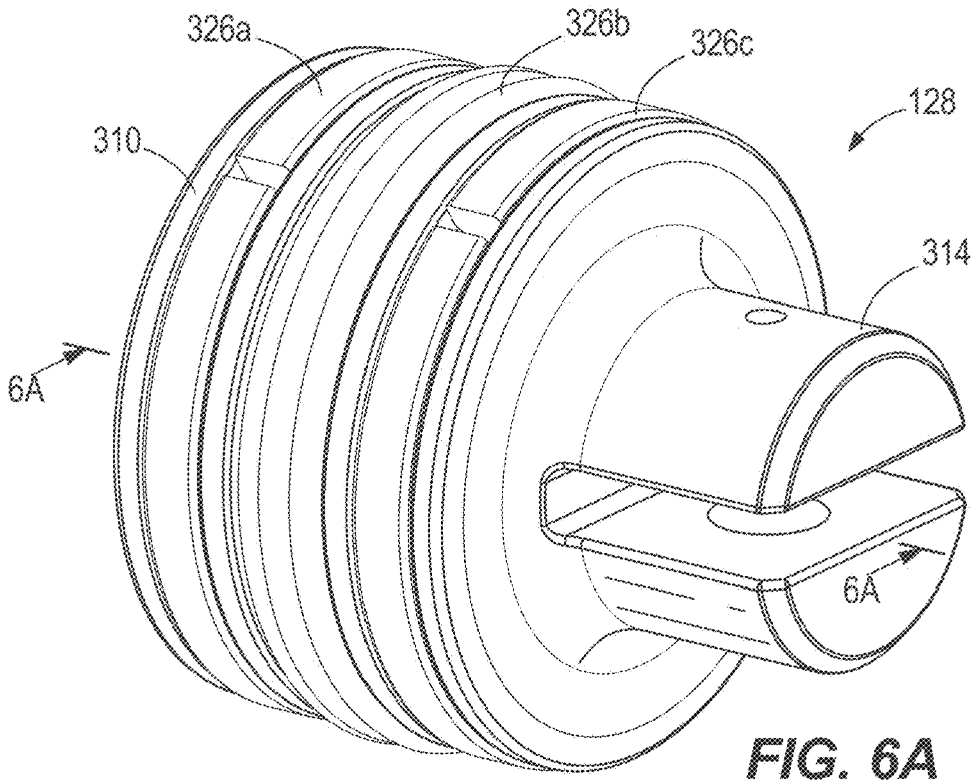
FIG. 6A is a perspective view of a piston of the gas spring-powered fastener driver of FIG. 1.
Figure 6B:
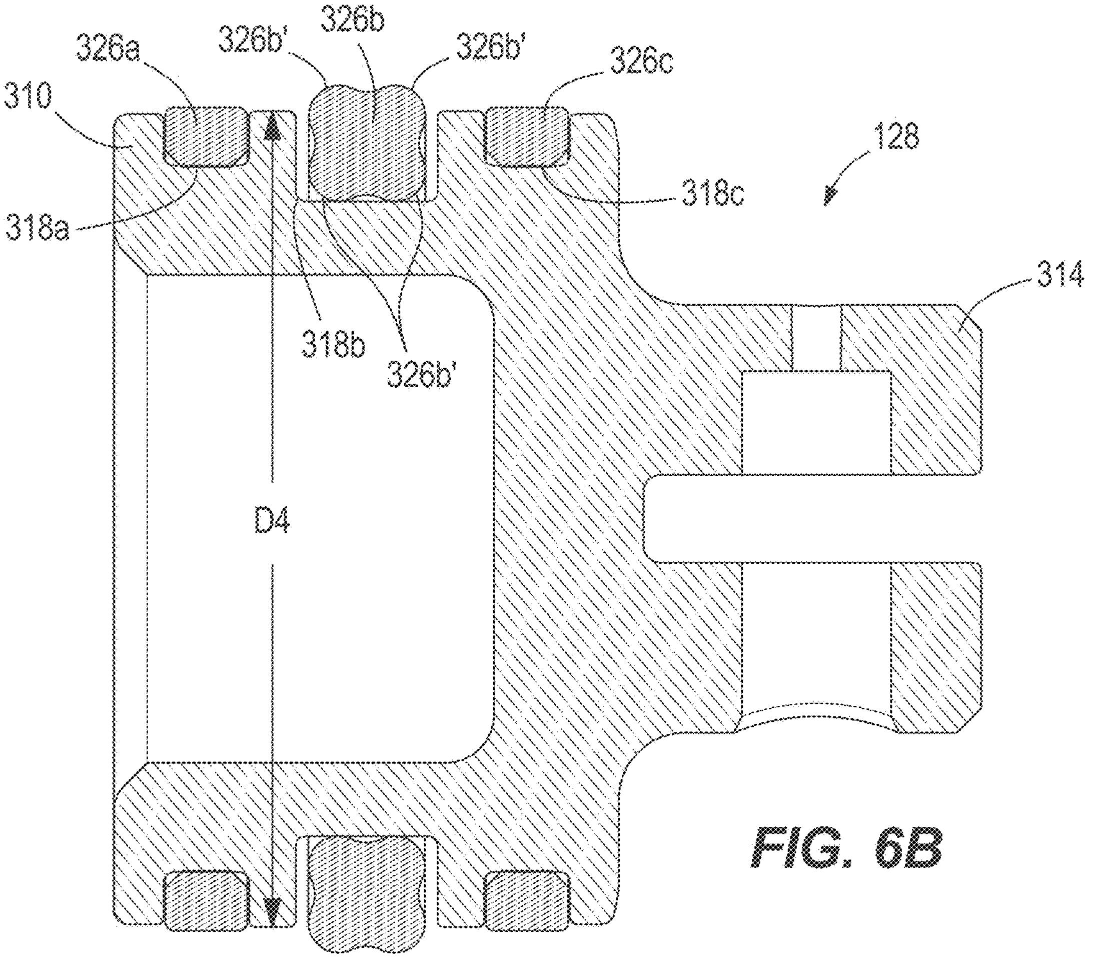
FIG. 6B is a cross-sectional view of the piston of FIG. 6A along line 6B—6B shown in FIG. 6A.
Figure 7A:
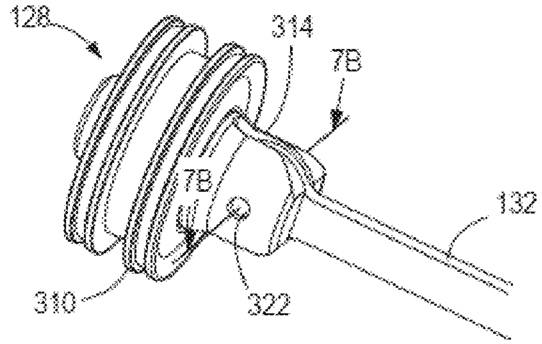
FIG. 7A is a perspective view of another piston and another driver blade.
Figure 7B:
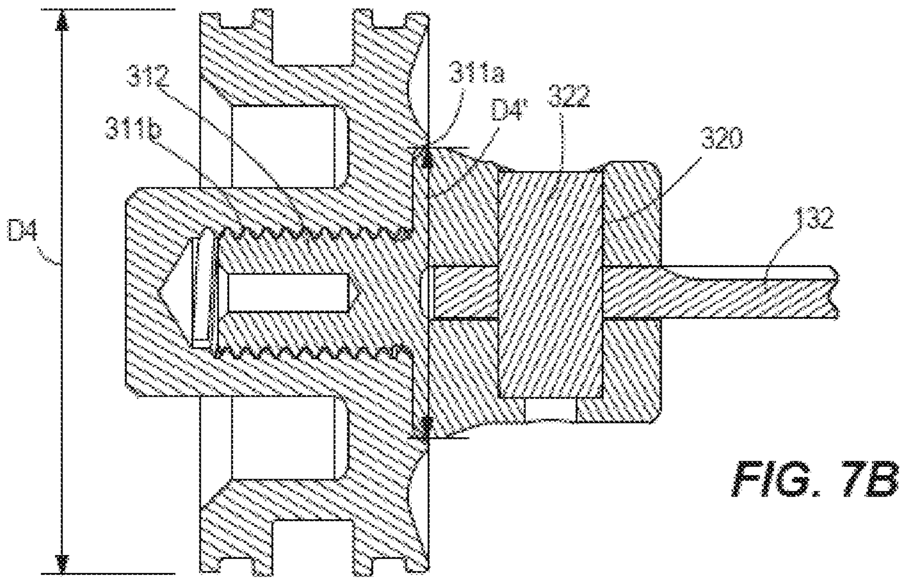
FIG. 7B is a cross-sectional view of the piston and the driver blade of FIG. 7A along the line 7B—7B of FIG. 7A.

With respect to FIG. 6A-6B, in the illustrated embodiment, the piston 128 includes a first portion 310 and a second portion 314 that is integrally formed with or otherwise coupled to the first portion 310. The first portion 310 defines a plurality of grooves 318*a*, 318*b*, 318*c* (e.g., circumferential grooves) that each extend about a circumference thereof. In the illustrated embodiment, the second groove 318*b* has a greater depth than the first and third grooves 318*a*, 318*c*. In the illustrated embodiment, the second portion 314 is integrally formed with the first portion 310. In some embodiments, the second portion 314 may be coupled to the first portion 310 via threaded engagement or via a fastener (as shown in FIG. 7A-7B and discussed below). The second portion 314 is coupled to the driver blade 132. In the illustrated embodiment, the driver blade 132 is positioned within a slot 320 of the second portion 314 and is coupled to the piston 128 via a fastener 322 (e.g., a pin, FIGS. 4-5 and FIGS. 7A-7B). In other embodiments, the driver blade 132 may be coupled to the piston in other ways (e.g., a threaded engagement).

In the embodiment of FIGS. 7A-7B, the piston 128 has a different configuration than that of the piston 128 of FIGS. 6A-6B, as noted above. Only the differences between the piston 128 of FIGS. 7A-7B and the piston 128 of FIGS. 6-7 will be discussed. In the embodiment of FIGS. 7A-7B, the first portion 310 and the second portion 314 are distinct components that are threadably coupled to one another. To this end, the first portion 310 includes a recess 311*a* positioned in one end and a threaded bore 311*b* extending from the recess 311*a* at least partially through the first portion 310. The recess 311*a* circumscribes the threaded bore 311*b*. The second portion 314 has a threaded projection 312 extending therefrom. The second portion 314 is coupled to the first portion 310 via the threaded engagement therebetween. Specifically, the threaded projection 312 is configured to be matingly coupled within the threaded bore 311*b*. When coupled, the second portion 314 is seated in the recess 34*a* of the first portion 310. In the embodiment of FIGS. 7A-7B, the first portion 310 of the piston 128 is constructed of a first material (e.g., aluminum) and second portion 314 of the piston 128, the driver blade 132, and the pin 322 are constructed from a second material (e.g., steel). In other embodiments, both the first and second portions 310, 314 of the piston 128, the driver blade 132, and the pin 322 may be constructed from the same second material (e.g., steel). In the illustrated embodiment, a central longitudinal axis extending through the threaded bore 311*b* is aligned with a central longitudinal axis of the first portions 310. Also, a central longitudinal axis extending through the second portion 314, which extends centrally through the slot 320, is aligned with the central longitudinal axis of the first portion 310 and the central longitudinal axis of the threaded bore 311*b*. In other embodiments, the central longitudinal axis extending through the threaded bore 311*b* may be offset relative to the central longitudinal axis of the first portion 310. In such case, the central longitudinal axis extending through the second portion 314 may also be offset relative to the central longitudinal axis of the first portion 310 such that the central longitudinal axis of the first portion 310 does not extend centrally through the slot 320.

In the illustrated embodiments, the piston 128 includes a smaller diameter compared to pistons in other gas spring-powered fastener drivers. The first portion 310 defines a maximum diameter D4 of the piston 128. A diameter D4' (FIG. 7B) of the second portion 314 is generally less than the diameter of the first portion 310, in the illustrated embodiment. Due to the reduced size of the piston 128 (e.g., the first portion 310 thereof), the pressure of the compressed gas necessary to move the piston 128 and driver blade 132 from the TDC position to the BDC position with sufficient force to adequately drive a nail into a workpiece increases.

The second groove 318*b* of the first portion 310 receives a seal ring 326*b* therein, which seals the piston 128 relative to the inner cylinder 124. As shown, the seal ring 326*b* is configured as a "quad ring." When configured as a quad ring, the seal ring 326*b* includes a cross-sectional shape having four lobes 326*b*', with adjacent lobes 326*b*' being equidistantly spaced. In other embodiments, the seal ring 326*b* may be an O-ring having a conventional cylindrical cross-section. Regardless of whether the quad ring or the O-ring is used, the seal ring 326*b* is made from an elastomer or plastic material having a material composition to reduce friction with the inner wall of the inner cylinder 124 during sliding contact therewith. Each of the O-ring and the quad ring preferably have a thickness of 2.5 mm to 5.6 mm. Additionally, each of the first and third grooves 318*a*, 318*c* include a guide ring 326*a*, 326*c*, as well. In the illustrated embodiment, the guide rings 326*a*, 326*c* contact the inner surface of the inner cylinder. The guide rings 326*a*, 326*c* create a low friction contact and prevents wear between the piston and the inner surface of the inner cylinder. In the illustrated embodiment, the guide rings 326*a*, 326*c* are formed from polyoxymethylene (POM) plastic, but other material may be used in other embodiments.

In the illustrated embodiments, the maximum diameter D4 measures approximately 25.3 mm (e.g., 1.0 inches). Thus, a total surface area of the piston 128 is approximately 502.7 $mm^2$. In other embodiments, the maximum diameter D4 of the piston 128 is less than approximately 50 mm and a total surface area exposed to the compressed gas in the inner cylinder 124 is less than approximately 1965 $mm^2$. In other embodiments, the maximum diameter D4 of the piston 128 is less than approximately 37 mm and a total surface area exposed to the compressed gas in the inner cylinder 124 is less than approximately 1075 $mm^2$. Additionally, the pressure of the compressed gas necessary to move the piston 128 and the driver blade 132 from the TDC position to the BDC position with sufficient force to adequately drive the nail into the workpiece is at least approximately 123 psi, which is greater than the pressure of conventional gas spring drivers when the piston is at the TDC position. In other embodiments, the pressure of the compressed gas necessary to move the piston 128 and the driver blade 132 from the TDC position to the BDC position with sufficient force to adequately drive the nail into the workpiece is at least approximately 331 psi, which is greater than the pressure of conventional gas spring drivers when the piston is at the TDC position. In still other embodiments, the pressure of the compressed gas necessary to move the piston 128 and the driver blade 132 from the TDC position to the BDC position with sufficient force to adequately drive the nail into the workpiece may be approximately 120 psi to approximately 335 psi, which is greater than the pressure of conventional gas spring drivers when the piston is at the TDC position. The non-concentric configuration of the storage chamber cylinder 120 and the inner cylinder 124 as well as the smaller diameter D4 of the piston 128 enables sufficient pressure to drive the piston 128 despite the reduced size of the driver 10, as a whole. Additionally, the thickness of the seal ring 326*b*, as well as the use the guide rings 326*a*, 326*c* helps to reduce permeation that results from the increased internal pressure. That is, the thickness of the seal ring 326*b*, as well as the guide rings 326*a*, 326*c* increases the compression of the seals to approximately 10%, which is at least twice as high as the seals used in conventional drivers.

With reference to FIG. 4-5, the driver 10 includes a bumper 330 positioned beneath the piston 128 for stopping the piston 128 at the driven or BDC position (FIG. 5) and absorbing the impact energy from the piston 128. The bumper 330 is configured to distribute the impact force of the piston 128 uniformly throughout the bumper 330 as the piston 128 is rapidly decelerated upon reaching the BDC position. The bumper 330 may be formed from any suitable elastic material (e.g., rubber).

Figure 8:
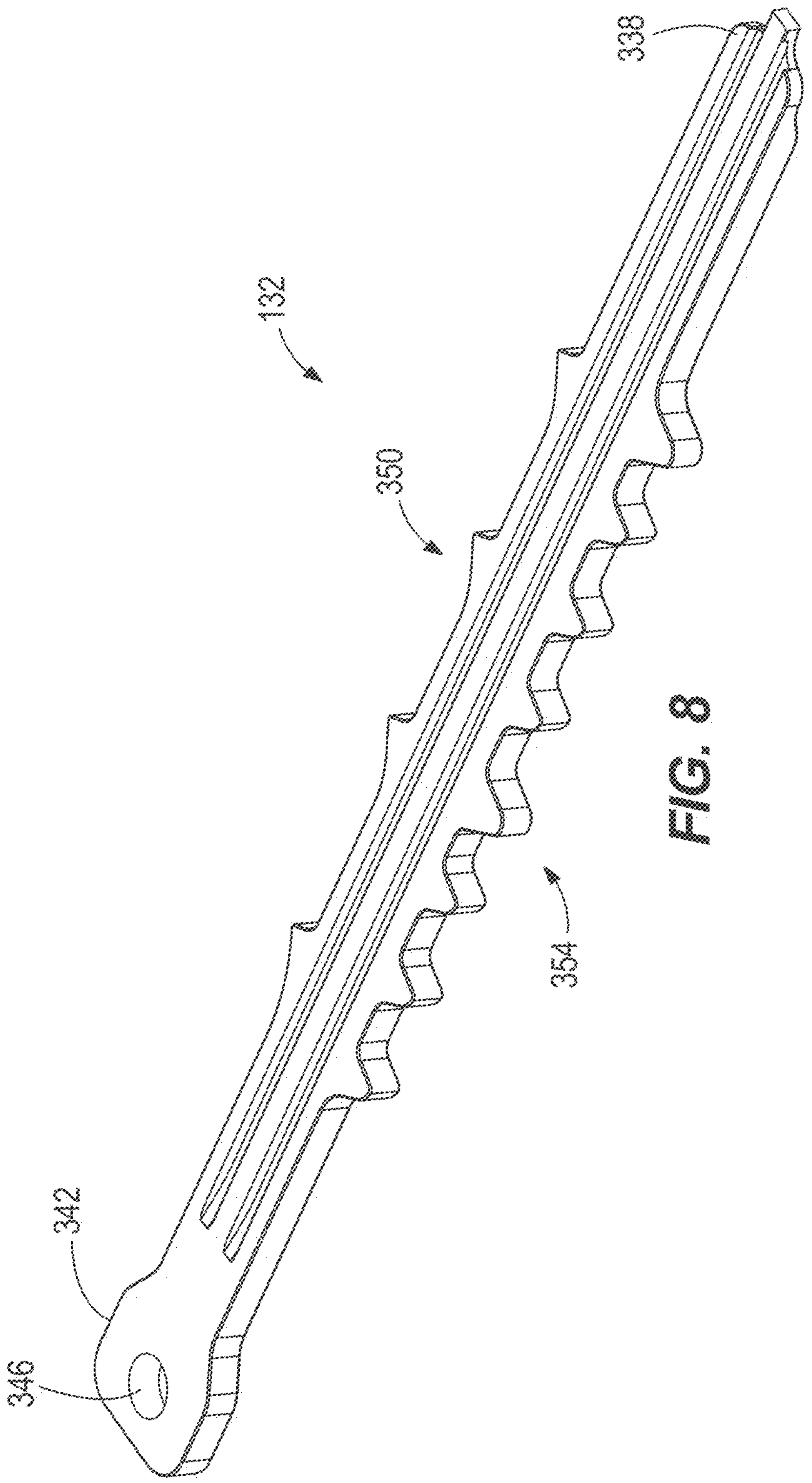
FIG. 8 is a perspective view of a driver blade of the gas spring-powered fastener driver of FIG. 1.
Figure 9:
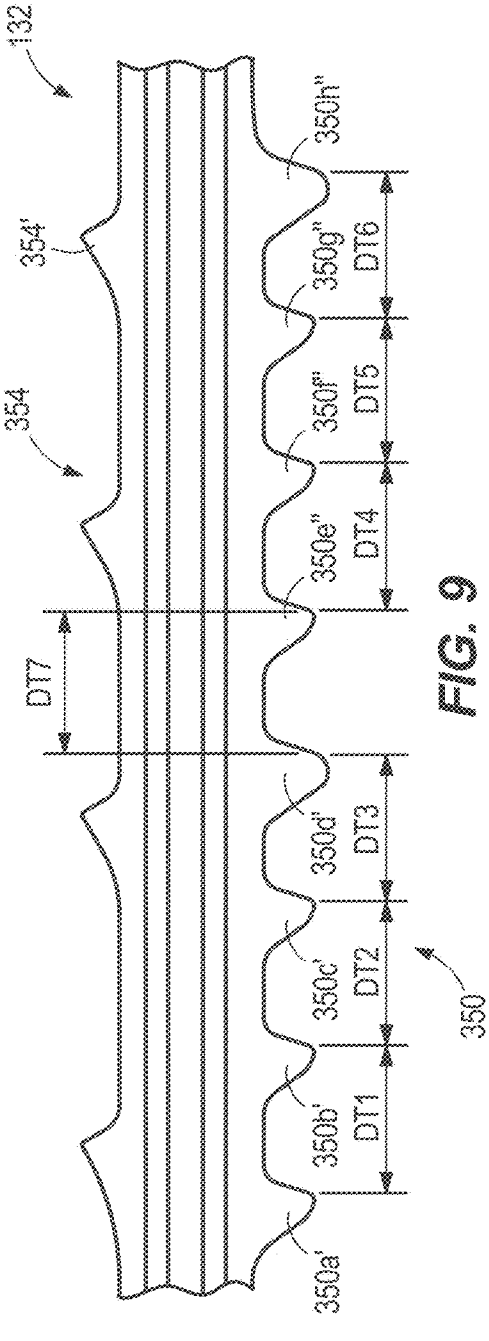
FIG. 9 is a detailed view of a driver blade of FIG. 8.

FIGS. 8-9 illustrate the detail of the driver blade 132. As shown, the driver blade 132 includes a first end 338 and a second end 342 opposite the first end 338. The first end 338 is a free end and the second end 342 is coupled to the piston 128. The second end 342 includes a bore 346 that is sized and shaped to receive the pin 322 therethrough to attach the driver blade 132 to the piston 128. The driver blade 132 further includes a driver tip at the first end 338 of the driver blade 132. The driver tip is configured to strike and drive a fastener.

The driver blade 132 includes a plurality of axially spaced drive teeth 350 on a first side of the driver blade 132 between the first end 338 and the second end 342 of the driver blade 132. As described in greater detail below, the drive teeth 350 are configured to engage the lifter 182 of the lifting mechanism 140 to move the driver blade 132 to the TDC (i.e., retracted or ready) position. As will be discussed in greater detail below, the lifter 182 is configured to rotate twice to lift the driver blade 132 from the BDC to the TDC positions. Accordingly, the drive teeth 335 include a first set of drive teeth 350*a*'-350*d*' that engage the lifter 182 during a first rotation and a second set of drive teeth 350*e*"-350*h*" that engage the lifter 182 during a second rotation. In the illustrated embodiment, a distance between adjacent drive teeth 350 is not the same. In other words, the distance between adjacent drive teeth 350 is variable. Also, in the illustrated embodiment, a distance (e.g., DT4, DT6) between some of the adjacent drive teeth (e.g., the distance between drive teeth 350*c*' and 350*d*' and the distance between 350*g*" and 350*h*") may be same, but different from distances between other of the adjacent drive teeth (e.g., the distance between drive teeth 350*a*' and 350*b*' and the distance between drive teeth 350*e*" and 350*f*"). Moreover, a distance (e.g., DT4) between adjacent drive teeth (e.g., the distance between drive teeth 350*c*' and 350*d*') within the first set of drive teeth may be the same as a distance (e.g., DT6) between adjacent drive teeth (e.g., the distance between drive teeth 350*c*' and 350*d*') within the second set of drive teeth. Even further, in the illustrated embodiment, a distance (e.g., DT7) between adjacent teeth (e.g., 350*d*', 350*e*") of the first set of drive teeth and the second set of drive teeth is less than the distances (e.g., DT4, DT6) between adjacent teeth within the first set of drive teeth and the second set of drive teeth. Finally, the distance DT7 between adjacent teeth (e.g., 350*d*', 350*e*") of the first set of drive teeth and the second set of drive teeth is less than the distances DT1-DT6 between adjacent teeth within each of the first set of drive teeth and the second set of drive teeth. The distances recited herein are measured from a lowermost tip of each tooth to a lowermost tip of the adjacent tooth.

As shown in FIG. 9, the distance between adjacent drive teeth 350*a*'-350*d*' within the first set is not the same. In other words, the distance between adjacent drive teeth 350*a*'-350*d*' within the first set is variable. That is, the first set has a distance DT1 between a first drive tooth 350*a*' and a second drive tooth 350*b*', a distance DT2 between the second drive tooth 350*b*' and a third drive tooth 350*c*', a distance DT3 between the third drive tooth 350*c*' and a fourth drive tooth 350*d*'. In the illustrated embodiment, the distance DT3 is different than the distances DT1, DT2, which are the same. In other words, the distances DT1 and DT3 are different, and in the illustrated embodiment, the distance DT3 is greater than DT1. In the illustrated embodiment, the distance DT1 measures approximately 8.5 mm, the distance DT2 measures approximately 8.5 mm, and the distance DT3 measures approximately 8.32 mm. In the other embodiments, the distance DT1 may measure approximately 6 mm to approximately 16 mm, the distance DT2 may measure approximately 6 mm to approximately 16 mm, and the distance DT3 may measure approximately 5 mm to approximately 13 mm. In other embodiments, the distances DT1, DT2, DT3 may be different from one another. In still other embodiments, the distance DT2 may be the same as DT3, which may be different than DT1. In still other embodiments, the distances DT1, DT2, DT3 may be the same.

Moreover, as shown in FIG. 9, a distance between adjacent drive teeth 350*e*"-350*h*" within the second set is not the same. In other words, the distance between adjacent drive teeth 350*e*"-350*h*" within the second set is variable. That is, the second set has a distance DT4 between a first drive tooth 350*e*" and a second drive tooth 350*f*, a distance DT5 between the second drive tooth 350*f*" and a third drive tooth 350*g*", a distance DT6 between the third drive tooth 350*g*" and a fourth drive tooth 350*h*". In the illustrated embodiment, the distance DT6 is different than the distances DT4, DT5, which are the same. In other words, the distance DT4 and DT6 are different, and in the illustrated embodiment, the distance DT6 is greater than DT4. In the illustrated embodiment, the distance DT4 measures approximately 8.5 mm, the distance DT5 measures approximately 8.5 mm, and the distance DT6 measures approximately 8.32 mm. In the other embodiments, the distance DT4 may measure approximately 6 mm to approximately 16 mm, the distance DT5 may measure approximately 6 mm to approximately 16 mm, and the distance DT6 may measure approximately 5 mm to approximately 13 mm. In other embodiments, the distances DT4, DT5, DT6 may be different from one another. In still other embodiments, the distance DT5 may be the same as DT6, which may be different than DT4. In still other embodiments, the distances DT4, DT5, DT6 may be the same.

Additionally, a distance DT7 between the first set of drive teeth 350*a*'-350*d*' and the second set of drive teeth 350*e*"-350*h*". That is, the distance DT7 is measured between the last drive tooth 350*d*' (e.g., the lowermost tooth) of the first set and the first drive tooth 350*e*" (e.g., the uppermost tooth) of the second set. In the illustrated embodiment, the distance DT7 is less than both the distance DT3 of the first set and the distance DT6 of the second set. Also, the distance DT7 is less than distance DT4 of the second set. In the illustrated embodiment, the distance DT7 measures approximately 6.42 mm. In other embodiments, the distance DT7 may measure between approximately 5 mm and approximately 13 mm. The distance DT7 relative to the distances DT3, DT4, and DT6, discussed above, are necessary to achieve the reduced stroke length L1. Specifically, DT7 being less than all three distances DT3, DT4, and DT6 enables a smaller diameter D5 of the drive pins 396 of the lifter 182, as will be discussed below. In contrast, if DT7 was greater than or equal to the distances DT3, DT4, and DT6, the diameter D5 of the lifter 182 would need to be bigger, which would in turn increase the stroke length L1.

The driver blade 132 also includes a plurality of axially spaced locking protrusions 354 on a second side of the driver blade 132, opposite the first side of the driver blade 132 and opposite the drive teeth 350, between the first end 338 and the second end 342 of the driver blade 132. As described in greater detail below, the locking protrusions 354 are configured to engage the latch 190 to hold the driver blade 132 in the TDC (i.e., retracted or ready) position prior to being released to the BDC (i.e., extended or driven) position.

Figure 3A:
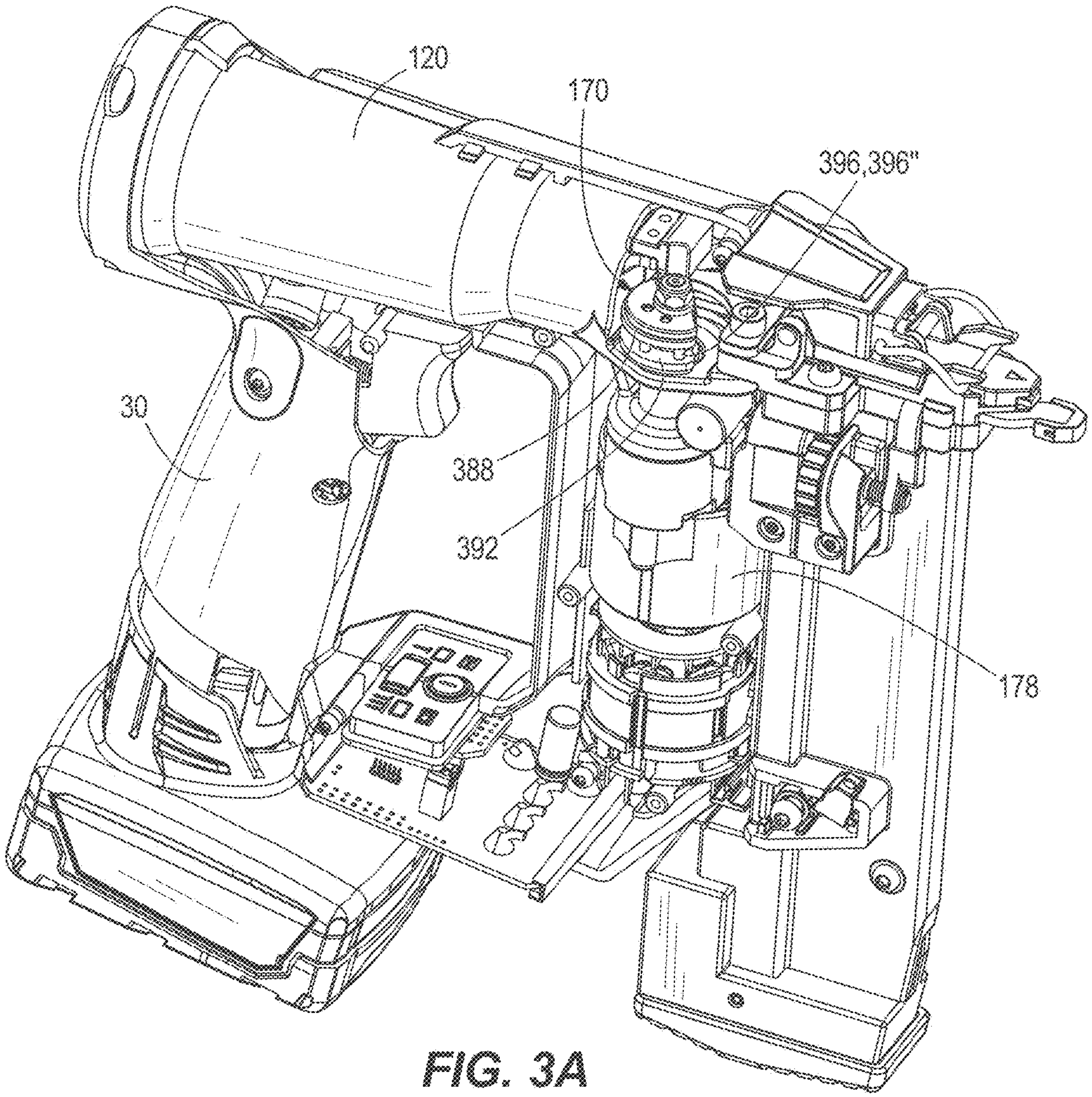
FIG. 3A is another perspective view of the gas spring-powered fastener driver of FIG. 1, with portions removed for clarity.
Figure 3B:
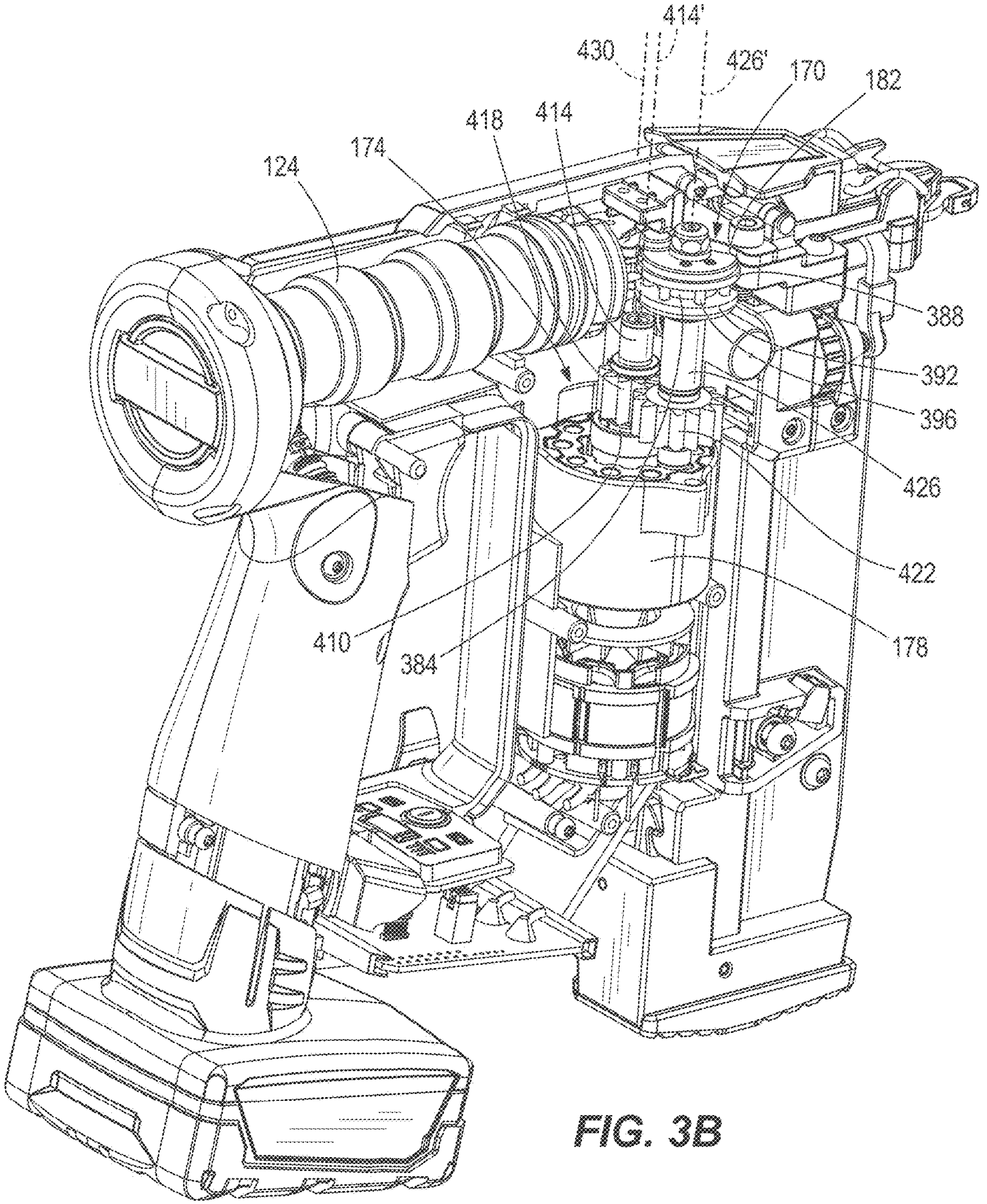
FIG. 3B is another perspective view of the gas spring-powered fastener driver of FIG. 1, with portions removed for clarity.
Figure 10:
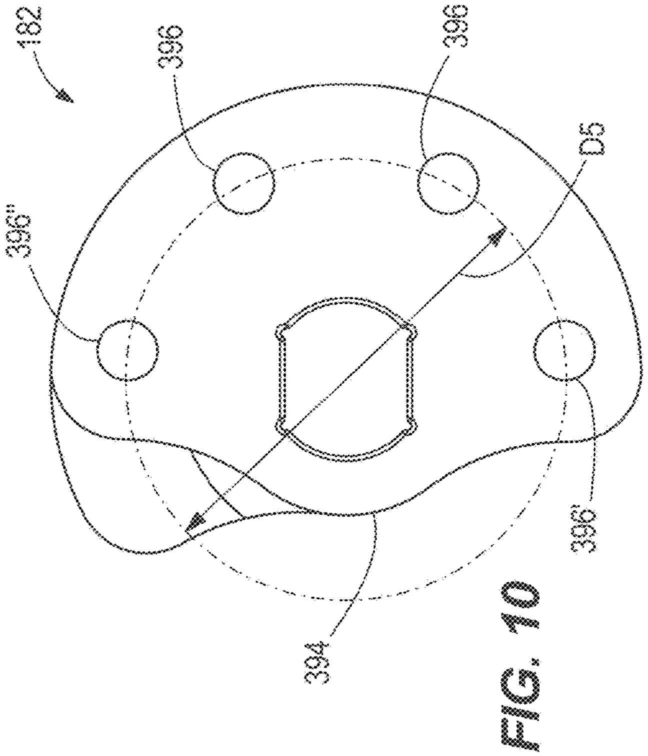
FIG. 10 is a top view of a lifter of the gas spring-powered fastener driver of FIG. 1.

The lifter 182 is shown in FIGS. 3A and 3B. The lifter 182 has a central hub 384 with an upper disk 388 and a lower disk 392 extending radially outward from the central hub 384 and spaced axially apart from each other. Each of the upper disk 388 and the lower disk 392 are formed with a peripheral notch 394 (FIG. 10). The peripheral notch 394 provides clearance for the driver blade 132 when the fastener driver 10 is fired and the driver blade 132 is moved to the BDC (i.e., extended or driven) position into the nosepiece 54 to forcibly eject a fastener therefrom and into a workpiece. The lifting mechanism 140 includes a plurality of drive pins 396 installed within the lifter 182. Each drive pin 396 is coupled to both the upper disk 388 and the lower disk 392. The drive pins 396 include a drive pin 396' that is configured to engage the drive tooth 350*h*" that is closest to the first end 338 of the driver blade 132 (e.g., the lowermost tooth), in the ready position. In this case, the lowermost drive tooth 350*h*" is also the fourth drive tooth 350*h*" of the first set of drive teeth. The drive pins 396 also include a drive pin 396" that is configured to engage the first drive tooth 350*a*' of the first set, which is also the tooth that is closest to the second end 342 of the driver blade 132 (e.g., the uppermost tooth), in the BDC position as the lifter 182 begins the first rotation. The drive pin 396" is also configured to engage the first drive tooth 350*e*" of the second set of drive teeth as the lifter 182 begins the second rotation. With respect to FIG. 10, the drive pins 396 are oriented along an imaginary circle that is coaxial with the rotational axis of the lifter 182 and that have a fifth diameter D5, which in this case measures approximately 18.75 mm. In other embodiments, the fifth diameter D5 may range from approximately 16 mm to approximately 60 mm. In still other embodiments, the fifth diameter D5 may range from approximately 16 mm to approximately 30 mm. Due to the reduced stroke length L1, the diameter D5 of the lifter 182 is also reduced relative to the lifters of conventional drivers. In other embodiments, the drive pin 396' may be oriented on a first imaginary circle that is coaxial with the rotational axis while the other drive pins 396, 396" may be oriented on a second, different imaginary circle that is coaxial with the rotational axis and larger than the first imaginary circle.

As described below in further detail, the transmission 174 raises the driver blade 132 from the driven position to the ready position. With reference to FIG. 3B, the transmission 174 provides torque to the lifter 182 from the motor 178. The transmission 174 includes an input shaft 410 and a first output shaft 414 extending along a first output shaft axis 414'. The first output shaft rotates a drive gear 418, which is operable to drive a driven gear 422. In the illustrated embodiment, the gears 418, 422 are meshed spur gears. Extending from the driven gear 422 is a second output shaft 426 (FIG. 5). The second output shaft 426 is operable to drive the lifter 182, which in turn is operable to move the driver blade 132 from the driven position to the ready position, as explained in greater detail below. In the illustrated embodiment, the second output shaft 426 extends along a second output shaft axis 426' (FIG. 3B) that is parallel to the first output shaft axis 414'. The second output shaft axis 426' is the rotational axis of the lifter 182. As shown, the second output shaft axis 426' is laterally offset from the driving axis 150. In the illustrated embodiment, the first output shaft axis 414' intersect the driving axis 150. In other embodiments, the first output shaft axis 414' may be positioned between the driving axis 150 and the second output shaft axis 426'. Although not shown, the transmission 174 is configured as a planetary transmission having a first planetary gear stage (not shown) and a second planetary gear stage (not shown). In alternative embodiments, the transmission may be a single-stage planetary transmission, or a multi-stage planetary transmission including any number of planetary gear stages. Also, the driver 10 further includes a one-way clutch mechanism (not shown) incorporated in the transmission 174. The one-way clutch mechanism permits a transfer of torque to the first output shaft 414 of the transmission 174 in a single (i.e., first) rotational direction (i.e., counter-clockwise from the frame of reference of FIG. 5), yet prevents the motor 178 from being driven in a reverse direction in response to an application of torque on the first output shaft 414 of the transmission 174 in an opposite, second rotational direction (e.g., clockwise from the frame of reference of FIG. 3B). In the illustrated embodiment, the one-way clutch mechanism is incorporated with the first planetary gear stage of the transmission 174. In alternative embodiments, the one-way clutch mechanism may be incorporated into the second planetary gear stage, for example.

Although not shown, in some embodiments, the driver 10 further includes a torque-limiting electronic-clutch mechanism, which limits an amount of torque transferred to the first output shaft 414 and the lifter 182.

With reference to FIG. 5, as noted above, in some embodiments, the latch 190 selectively holds the driver blade 132 in the ready position, and a solenoid (not shown) for releasing the latch 190 from the driver blade 132. In other words, the latch assembly is moveable between a latched state in which the driver blade 132 is held in the ready position against a biasing force (i.e., the pressurized gas in the storage chamber cylinder 120), and a released state in which the driver blade 132 is permitted to be driven by the biasing force from the ready position to the driven position. The latch 190 is pivotably supported by a shaft (not shown) on the base portion 80 about a latch axis 430 (shown in FIG. 3 and which is into the page as shown in FIG. 5). The latch axis 430 is parallel to the second output shaft axis 426' of the second output shaft 426.

With reference to FIG. 5, the latch assembly is positioned proximate the side of the driver blade 132 that is opposite the lifting assembly 170. Furthermore, the latch 190 is configured to rotate, via actuation of the solenoid, about the shaft relative to the latch axis 430 such that a tip of the latch 190 is configured to engage a stop surface (not shown) of the nosepiece assembly 50 when the latch 190 is moved toward the driver blade 132.

The latch 190 is moveable between a latched position (coinciding with the latched state of the latch assembly) in which the latch 190 is engaged with one of the locking protrusions 354 on the driver blade 132 for holding the driver blade 132 in the ready position against the biasing force of the compressed gas, and a released position (coinciding with the released state of the latch assembly) in which the driver blade 132 is permitted to be driven by the biasing force of the compressed gas from the ready position to the driven position. Furthermore, the stop surface, against which the latch 190 is engageable when the solenoid is de-energized, limits the extent to which the latch 190 is rotatable in a counter-clockwise direction from the frame of reference of FIG. 5 about the latch axis 430 upon return to the latched state.

The operation of a firing cycle for the driver 10 is detailed below. Prior to initiation a firing cycle, the driver blade 132 is held in the ready position with the piston 128 near top dead center within the inner cylinder 124. More specifically, the drive pin 396' on the lifter 182 is engaged with a lowermost drive tooth 350*h*" (FIG. 5) of the axially spaced teeth drive teeth 350 on the driver blade 132, and the rotational position of the lifter 182 is maintained by the one-way clutch mechanism. In other words, as previously described, the one-way clutch mechanism prevents the motor 178 from being back-driven by the transmission 174 when the lifter 182 is holding the driver blade 132 in the ready position. Also, in the ready position of the driver blade 132, the latch 190 is engageable with a lower-most locking protrusion 354' on the driver blade 132, though not necessarily in contact with and functioning to maintain the driver blade 132 in the ready position. Rather, the latch 190 at this instant provides a safety function to prevent the driver blade 132 from inadvertently firing should the one-way clutch mechanism fail.

Upon the trigger 186 being pulled to initiate a firing cycle, the solenoid is energized to pivot the latch 190 from the latched position to the release position, thereby repositioning the latch 190 so that it is no longer engageable with the locking protrusions 354 (defining the released state of the latch assembly). At about the same time, the motor 178 is activated to rotate the first output shaft 414 and the lifter 182 in a counter-clockwise direction from the frame of reference of FIG. 5, thereby displacing the driver blade 132 upward past the ready position a slight amount before the lowermost drive tooth 350*h*" on the driver blade 132 slips off the drive pin 396' (at the TDC position of the driver blade 132). Thereafter, the piston 128 and the driver blade 132 are thrust downward toward the driven position by the expanding gas in the inner cylinder 124 and storage chamber cylinder 120. As the driver blade 132 is displaced toward the driven position, the motor 178 remains activated to continue counter-clockwise rotation of the lifter 182.

With reference to FIG. 5, in some embodiments, upon a fastener being driven into a workpiece, the piston 128 impacts the bumper 330 to quickly decelerate the piston 128 and the driver blade 132, eventually stopping the piston 128 in the driven or bottom dead center position.

Shortly after the driver blade 132 reaches the driven position, the lifter 182 begins the first rotation. Specifically, the drive pin 396" on the lifter 182 engages the first drive tooth 350*a*' in the first set of drive teeth 350 on the driver blade 132 and continued counter-clockwise rotation of the lifter 182 raises the driver blade 132 and the piston 128 toward the ready position as drive pins 396 engage subsequent drive teeth 350*b*', 350*c*', 350*d*' of the first set. Shortly thereafter and prior to the lifter 182 making one complete rotation, the solenoid is de-energized, permitting the latch 190 to re-engage the driver blade 132 and ratchet around the locking protrusion 354 as upward displacement of the driver blade 132 continues (defining the latched state of the latch assembly).

After one complete rotation of the lifter 182 occurs, the latch 190 maintains the driver blade 132 in an intermediate position between the driven position and the ready position while the lifter 182 continues counter-clockwise rotation (from the frame of reference of FIG. 5) until the drive pin 396" re-engages another of the lifting drive teeth 350 on the driver blade 132. Specifically, as the lifter 182 begins the second rotation, the drive pin 396" on the lifter 182 engages the first drive tooth 350*e*" in the second set of drive teeth 350 on the driver blade 132 and continued counter-clockwise rotation of the lifter 182 raises the driver blade 132 and the piston 128 toward the ready position as drive pins 396 engage subsequent drive teeth 350*f*', 350*g*", 350*h*" of the first set. After the second complete rotation, the driver blade 132 is once again in the ready position, such that the drive pin 396' is once again positioned adjacent to and engages the lowermost drive tooth 350*h*".

As noted above, the reduced stroke length L1 of the driver blade 132 enables a reduced size of the lifter 182. That is, the driver pins 396 are able to be oriented on an imaginary circles that has a reduced diameter D5. The reduced size of the lifter 182 allows more operation of the motor 178 to be more efficient. That is, the reduced size of the lifter 182 reduces the required motor torque and geartrain loading, while maintaining effectiveness of the fastener driver 10. For example, in the illustrated embodiment, the motor torque from the BDC position to the TDC position is 0.1 Newton-meter (Nm) to 0.2 Nm. Additionally, the drive cycle of the fastener 10 is also shorter. The driver blade 132 is configured to reciprocate between the TDC position and the BDC position at a frequency of at least approximately 2.5 Hertz (Hz). In other embodiments, the driver blade 132 is configured to reciprocate between the TDC position and the BDC position at a frequency of approximately 1 Hz to 8 Hz. In other embodiments, the driver blade 132 is configured to reciprocate between the TDC position and the BDC position at a frequency of approximately 1 Hz to 4 Hz. Moreover, the stroke length L1 of the piston 128 between the TDC position and the BDC position is 73 mm or less while reciprocating at a frequency of at least 2.5 Hz. Because the motor 178 is more efficient, the motor 178 requires less energy per cycle. This means that more fasteners can be driven before the battery pack is depleted. In the illustrated embodiment, for example, the driver 10 can drive 725 fasteners using a single battery pack. The drive unit is configured to remain continuously activated for over approximately 290 seconds while reciprocating the driver blade at a frequency of at least approximately 2.5 Hz. The drive unit is configured to remain continuously activated for approximately 250 seconds to approximately 350 seconds while reciprocating the driver blade at a frequency of at least approximately 2.5 Hz.

Although the invention has been described in detail with reference to certain preferred embodiments, variations and modifications exist within the scope and spirit of one or more independent aspects of the invention as described.

Various features of the invention are set forth in the following claims.

What is claimed is:

1. A powered fastener driver comprising:

a housing;

an inner cylinder within the housing;

a piston movable within the inner cylinder from a top-dead-center (TDC) position to a driven or bottom-dead-center (BDC) position, the piston having a stroke length between the TDC position and the BDC position measuring 73 mm or less;

a driver blade attached to the piston for movement therewith along a driving axis from the TDC position toward the BDC position for driving a fastener into a workpiece, the driver blade including a first end, a second end opposite the first end and attached to the piston, a first set of drive teeth extending from a first side of the driver blade between the first end and the second end, adjacent drive teeth within the first set being separated from one another by a first distance, and a second set of drive teeth extending from the first side of the driver blade, adjacent drive teeth within the second set being separated from one another by a second distance that is equal to the first distance, wherein adjacent drive teeth in the first set and the second set, respectively, are separated from one another by a third distance that is less than each of the first and second distance;

a lifter operable to move the piston and driver blade from the BDC position toward the TDC position, the lifter engaging the first set of drive teeth during a first rotation to move the piston and driver blade from the BDC position to an intermediate position between the BDC position and the TDC position, and engaging the second set of drive teeth during a second rotation to move the piston from the intermediate position toward the TDC position; and a drive unit operably coupled to the lifter to provide torque thereto, causing the lifter to rotate.

2. The powered fastener driver of claim 1, further comprising an outer storage chamber cylinder positioned within the housing and including pressurized gas in fluid communication with the inner cylinder, wherein the outer storage chamber cylinder includes a first end and a second end opposite the first end, and wherein the first end defines a first longitudinal axis that is co-linear with the driving axis and the second end defines a second longitudinal axis that extends through a center thereof and is offset from the first longitudinal axis, such that the second end of the outer storage chamber cylinder is non-concentric with the first end of the outer storage chamber cylinder.

3. The powered fastener driver of claim 2, wherein the inner cylinder includes a first end and a second end opposite a first end, and wherein the first end of the inner cylinder is coupled to the first end of the outer storage chamber cylinder.

4. The powered fastener driver of claim 3, wherein the outer storage chamber cylinder defines a volume, wherein a first portion of the volume is defined on a first side of the driving axis and a second portion of the volume is defined on a second side of the driving axis, and wherein the second portion is greater than the first portion.

5. The powered fastener driver of claim 4, wherein the housing defines a cylinder support portion, a drive unit support portion, and a handle portion that is spaced apart from the drive unit support portion, and wherein the second portion of the volume is at least partially positioned between the drive unit support portion and the handle portion.

6. The powered fastener driver of claim 1, wherein the piston includes a circumferential groove, wherein a seal ring is positioned within the circumferential groove, and wherein the seal ring has a thickness of 2.5 mm to 5.5 mm.

7. The powered fastener driver of claim 6, wherein the seal ring is a quad ring.

8. The powered fastener driver of claim 1, wherein a distance between a lowermost tooth and an adjacent tooth of the first set of drive teeth defines the first distance, and wherein a distance between a lowermost tooth and an adjacent tooth of the second set of drive teeth defines the second distance.

9. The powered fastener driver of claim 1, wherein, in response to continuous activation of the drive unit to rotate the lifter, the driver blade is configured to reciprocate between the TDC position and the BDC position at a frequency between 2.5 Hertz (Hz) and 8 Hertz (Hz).

10. The powered fastener driver of claim 9, wherein the drive unit is configured to remain continuously activated for 290 seconds to 350 seconds while reciprocating the driver blade at a frequency between 2.5 Hertz (Hz) and 8 Hertz (Hz).

11. A powered fastener driver comprising:

a housing;

an inner cylinder within the housing;

a piston movable within the inner cylinder from a top-dead-center (TDC) position to a driven or bottom-dead-center (BDC) position, the piston having a diameter of less than 50 mm, and a stroke length of the piston between the TDC position and the BDC position measuring between 60 mm and 74 mm;

a driver blade attached to the piston for movement therewith along a driving axis from the TDC position toward the BDC position for driving a fastener into a workpiece;

a lifter operable to move the piston and driver blade from the BDC position toward the TDC position, the lifter including a plurality of drive pins configured to engage the driver blade, the plurality of drive pins being positioned along an imaginary circle coaxial with a rotational axis of the lifter and having a diameter of less than 60 mm; and a drive unit operably coupled to the lifter to provide torque thereto, causing the lifter to rotate.

12. The powered fastener driver of claim 11, further comprising a source of pressurized gas in fluid communication with the inner cylinder, wherein a pressure of the pressurized gas acting on the piston at the TDC position is between 120 psi and 335 psi.

13. The powered fastener driver of claim 11, further comprising an outer storage chamber cylinder positioned within the housing and including a pressurized gas in fluid communication with the inner cylinder, wherein the outer storage chamber cylinder includes a first end and a second end opposite the first end, and wherein the first end defines a first longitudinal axis that is co-linear with the driving axis and the second end defines a second longitudinal axis that extends through a center thereof and is offset from the first longitudinal axis, such that the second end of the outer storage chamber cylinder is non-concentric with the first end of the outer storage chamber cylinder.

14. The powered fastener driver of claim 13, wherein the inner cylinder includes a first end and a second end opposite a first end, and wherein the first end of the inner cylinder is coupled to the first end of the outer storage chamber cylinder.

15. The powered fastener driver of claim 14, wherein the storage chamber cylinder defines a volume, wherein a first portion of the volume is defined on a first side of the driving axis and a second portion of the volume is defined on a second side of the driving axis, and wherein the second portion is greater than the first portion.

16. The powered fastener driver of claim 15, wherein the housing defines a cylinder support portion, a drive unit housing portion, and a handle portion that is spaced apart from the drive unit housing portion, and wherein the second portion of the volume is at least partially positioned between the drive unit housing portion and the handle portion.

17. A powered fastener driver comprising:

a housing;

an inner cylinder within the housing;

a piston movable within the inner cylinder from a top-dead-center (TDC) position to a driven or bottom-dead-center (BDC) position, the piston having a stroke length between the TDC position and the BDC position measuring 73 mm or less;

a driver blade attached to the piston for movement therewith along a driving axis from the TDC position toward the BDC position for driving a fastener into a workpiece, the driver blade including a first end, a second end opposite the first end and attached to the piston, a first set of drive teeth extending from a first side of the driver blade between the first end and the second end, adjacent drive teeth within the first set being separated from one another by a first distance, and a second set of drive teeth extending from the first side of the driver blade, adjacent drive teeth within the second set being separated from one another by a second distance that is equal to the first distance, wherein adjacent drive teeth in the first set and the second set, respectively, are separated from one another by a third distance that is less than each of the first and second distance;

a lifter operable to move the piston and driver blade from the BDC position toward the TDC position, the lifter engaging the first set of drive teeth during a first rotation to move the piston and driver blade from the BDC position to an intermediate position between the BDC position and the TDC position, and engaging the second set of drive teeth during a second rotation to move the piston from the intermediate position toward the TDC position, the lifter including a body and a plurality of drive pins supported upon the body, wherein each of the plurality of drive pins is configured to engage one of the drive teeth of the first set and one of the drive teeth of the second set, and wherein the drive pins are positioned on the body along an imaginary circle coaxial with a rotational axis of the lifter and having a diameter of less than 60 mm; and a drive unit operably coupled to the lifter to provide torque thereto, causing the lifter to rotate.

18. The powered fastener driver of claim 17, further comprising a source of pressurized gas in fluid communication with the inner cylinder, wherein a pressure of the pressurized gas acting on the piston at the TDC position is between 120 psi and 335 psi.

19. The powered fastener driver of claim 18, further comprising an outer storage chamber cylinder positioned within the housing and including the pressurized gas in fluid communication with the inner cylinder, wherein the outer storage chamber cylinder includes a first end and a second end opposite the first end, and wherein the first end defines a first longitudinal axis that is co-linear with the driving axis and the second end defines a second longitudinal axis that extends through a center thereof and is offset from the first longitudinal axis, such that the second end of the outer storage chamber cylinder is non-concentric with the first end of the outer storage chamber cylinder.

20. The powered fastener driver of claim 19, wherein the outer storage chamber cylinder defines a volume, wherein a first portion of the volume is defined on a first side of the driving axis and a second portion of the volume is defined on a second side of the driving axis, and wherein the second portion is greater than the first portion, and the housing defines a cylinder support portion, a drive unit housing portion, and a handle portion that is spaced apart from the drive unit housing portion, and wherein the second portion of the volume is at least partially positioned between the drive unit housing portion and the handle portion.

* * * * *